US012516822B1

(12) United States Patent
Lin

(10) Patent No.: US 12,516,822 B1
(45) Date of Patent: Jan. 6, 2026

(54) LONG-BAR LATCH WITH ENHANCED SERVICEABILITY FEATURES

(71) Applicant: HTI Technology and Industries, Inc., La Vergne, TN (US)

(72) Inventor: I-Chiang Lin, San Mateo, CA (US)

(73) Assignee: HTI Technology and Industries, Inc., La Vergne, TN (US)

( * ) Notice: Subject to any disclaimer, the term of this patent is extended or adjusted under 35 U.S.C. 154(b) by 708 days.

(21) Appl. No.: 17/725,994

(22) Filed: Apr. 21, 2022

Related U.S. Application Data

(60) Provisional application No. 63/177,618, filed on Apr. 21, 2021.

(51) Int. Cl.

| | |
|---|---|
| ***F24C 15/02*** | (2006.01) |
| ***E05B 9/08*** | (2006.01) |
| ***E05B 47/00*** | (2006.01) |
| ***F24C 14/00*** | (2006.01) |

(52) U.S. Cl.
CPC .............. *F24C 15/022* (2013.01); *E05B 9/08* (2013.01); *E05B 47/0012* (2013.01); *F24C 14/00* (2013.01)

(58) Field of Classification Search
CPC .......... F24C 15/022; F24C 14/00; E05B 9/08; E05B 47/0012
USPC .......................................................... 126/197
See application file for complete search history.

(56) References Cited

U.S. PATENT DOCUMENTS

| | | | | |
|---|---|---|---|---|
| 3,462,584 A | | 8/1969 | Guy | |
| 4,593,945 A | | 6/1986 | Arute | |
| 4,691,195 A | | 9/1987 | Sigelman | |
| 4,927,996 A | | 5/1990 | Genbauffe | |
| 5,220,153 A | | 6/1993 | Malone | |
| 5,516,164 A | | 5/1996 | Kobayashi | |
| 5,746,076 A | | 5/1998 | Inoue | |
| 5,938,252 A | | 8/1999 | Jemura | |
| 6,302,098 B1 | * | 10/2001 | Smith | F24C 15/022 292/109 |
| 6,315,336 B1 | | 11/2001 | Swartzell | |

(Continued)

FOREIGN PATENT DOCUMENTS

| | | | | |
|---|---|---|---|---|
| CN | 205591791 U | * | 9/2016 | E06B 9/52 |
| CN | 207461774 U | * | 6/2018 | A47B 95/04 |

(Continued)

OTHER PUBLICATIONS

Hex Bolts, Screws that Form their own Threads, 10 pages, https://www.boltsales.com/screws-that-form-their-own-threads/ (Year: 2020).*

(Continued)

*Primary Examiner* — Michael G Hoang
*Assistant Examiner* — Elizabeth Ann Laughlin
(74) *Attorney, Agent, or Firm* — Emerson, Thomson & Bennett, LLC; Roger D. Emerson; Peter R. Detorre

(57) ABSTRACT

Provided is a long-bar latch assembly for an appliance such as an oven. The long-bar latch assembly is used during operation of a self-cleaning mode or function of the associated appliance. The long-bar latch assembly provided herein includes features that allows for accurate positioning of the long-bar latch assembly during servicing procedures. It also allows for appliance servicemen to conduct a simpler repair and operate in a more efficient manner when working to repair a long-bar latch assembly that has failed.

1 Claim, 10 Drawing Sheets

(56) References Cited

U.S. PATENT DOCUMENTS 6,698,418 B2 3/2004 Ramsey
6,709,029 B2 3/2004 Cole
6,863,316 B2 3/2005 Cole
7,010,947 B2 3/2006 Milo
7,036,853 B2 * 5/2006 Smock .................. F24C 15/022 292/201
7,040,674 B2 5/2006 Lomicka et al.
7,066,503 B2 * 6/2006 Smith .................. F24C 15/022 292/201
7,137,387 B2 11/2006 Edwards
7,156,428 B2 1/2007 Smith
7,185,925 B2 3/2007 Courter
7,334,823 B2 2/2008 Courter
7,364,209 B2 4/2008 Lomicka et al.
7,726,294 B2 6/2010 Collene
8,919,828 B2 12/2014 Barth
9,335,056 B1 5/2016 Lomicka et al.
9,958,167 B2 5/2018 Lomicka et al.
10,806,322 B2 10/2020 Dirnberger
11,236,911 B2 2/2022 DeYoung
2003/0080569 A1 5/2003 Raymond et al.
2003/0116975 A1 6/2003 Cole
2003/0209042 A1 * 11/2003 Yeh .................... E05B 47/0012 70/280
2004/0140677 A1 7/2004 Hengelein
2004/0160070 A1 * 8/2004 Huang .................... E05B 9/002 292/337
2004/0187858 A1 * 9/2004 Ramsey .............. E05B 47/0012 126/192
2005/0077737 A1 4/2005 Komiyama
2005/0284464 A1 * 12/2005 Edwards ............... F24C 15/022 126/197
2006/0102166 A1 * 5/2006 Simmons .............. F24C 15/022 126/197
2006/0208502 A1 9/2006 Parent
2006/0237974 A1 10/2006 Hamm
2008/0030028 A1 2/2008 Heid et al.
2008/0169657 A1 7/2008 Horton
2009/0091143 A1 * 4/2009 Van Parys ........... E05B 47/0012 292/195
2009/0202286 A1 8/2009 Hirabayashi
2015/0330112 A1 11/2015 Van Wiemeersch
2017/0145613 A1 5/2017 Choi
2018/0371806 A1 12/2018 Jeong
2019/0017216 A1 1/2019 Dirnberger
2019/0316400 A1 10/2019 Shin
2019/0345744 A1 * 11/2019 Woo ........................ F16C 1/102
2020/0258695 A1 * 8/2020 Grimm .................... H01H 3/38

FOREIGN PATENT DOCUMENTS

CN 207905531 9/2018
CN 109209084 1/2019
CN 112112500 12/2020
DE 10111085 A1 * 9/2002 ............. E05B 81/06
DE 102005024588 A1 * 11/2006 ............. E05B 81/14
DE 202012005738 11/2013
EP 2755283 A2 * 7/2014 ............. H01R 13/41
EP 2840208 2/2015
ES 289332 U * 2/1986 ............. A63H 33/04
GB 2027165 A * 2/1980 ............... E05B 3/10
WO 2010056062 5/2010
WO WO-2017192822 A1 * 11/2017 ......... E05B 47/0012

OTHER PUBLICATIONS

Chinese to English machine translation for CN205591791U.*
Chinese to English machine translation for CN207461774U.*
German to English machine translation for DE10111085.*
German to English machine translation for DE102005024588A1.*
Spanish to English machine translation for ES289332U.*

* cited by examiner

LONG-BAR LATCH WITH ENHANCED SERVICEABILITY FEATURES

TECHNICAL FIELD

Provided is a long-bar latch for appliances such as ovens. The long-bar latch is used during operation of a self-cleaning mode of the appliance and provides enhanced servicing features upon latch failure compared to existing latches.

BACKGROUND

Residential grade self-clean oven appliances have become commonplace in nearly every home. Millions of self-clean ovens are sold each year. Consequently, the need for efficient and reliable servicing of oven parts is critical for managing service costs for both in-warranty and out-of-warranty appliances. One of the more difficult components to service is the self-clean latch. This latch is required by safety compliance agencies to ensure safe operation of the oven during the very high-temperature self-clean process. These latches interface with the oven's electronic controller to lock oven doors and to provide latch position feedback to the oven controller during the self-clean process. The oven controller has programed logic to prevent the initiation of the self-clean process and stop the self-clean process in the event of any latch failure or feedback anomaly. If a customer experiences a problem with the self-clean process, the oven controller will generate an error code and a professional service call is needed to diagnose and resolve the issue. Service calls for in-warranty issues are expensive for the manufacturer and service calls for out-of-warranty issues are expensive for the customer. Sometimes, a diagnosis will identify the self-clean latch as needing repair or replacement. Due to the embedded location of the latch within the oven appliance, replacing or repairing the latch may require extensive time, (billable labor), to perform the task. In the case of long-bar style of oven latches, which traverses the span from the front of the oven appliance to the rear of the appliance, this task may require extensive disassembly of the oven to service the latch. One known latching device or long-bar latch in the art incorporates a serviceable motor and switch assembly. This motor and switch assembly is located outside of the rear panel of the appliance and is easily removed with two screws and does not require extensive disassembly of the oven to service the latch.

However, there are deficiencies with the long-bar latch that is known in the art. These deficiencies are described below.

First, the service technician must reinstall self-tapping screws into previously threaded apertures of the long-bar latch known in the art. The reinstallation of these screws is vulnerable to stripping due to the worn nature of the apertures and the potential of over-torquing by the service technician.

Second, the long-bar latch known in the art relies on the screws to entirely position the motor and plate assembly. Self-clean latches inherently require accurate positioning of the motor and plate assembly with respect to the latch hook and linkage components. If servicing of the latch is not performed properly, the latch may not perform or operate properly. This may result in the need for subsequent servicing of the latching device. If such servicing is not performed, it may allow for improper operation of the self-clean process. Consequently, the long-bar latch known in the art requires careful verification by the technician to ensure the function is not compromised.

The long-bar latch known in the art also has limited latch hook pull-in force due to the surface-to-surface attachment of the motor and plate assembly to the long-bar structure.

What is needed is a long-bar latch that can be serviced with efficiency and eliminate the previously mentioned deficiencies of prior art.

SUMMARY

Provided is a long-bar latch for an appliance that latches an appliance door closed during self-clean operations including a rear bracket and a service replaceable motor and plate subassembly engaged to the rear bracket of the long-bar latch, wherein the service replaceable motor and plate subassembly is capable of being replaced with a screwdriver.

According to further aspects of the present teaching, the rear bracket of the long-bar latch is capable of engaging a self-tapping screw to affix the motor and plate subassembly to the rear bracket of the long-bar latch.

According to further aspects of the present teaching, at least one tab integrated into the motor and plate subassembly engages a corresponding aperture in the rear bracket of the long-bar latch.

According to further aspects of the present teaching, the aperture in the rear bracket of the long-bar latch is rectangular in shape and the tab includes a shape and structural edges capable of engaging the rectangular shape of the aperture.

According to further aspects of the present teaching, the at least one tab and corresponding aperture allows for precise positioning of a replacement motor and plate subassembly when installed during an in-the-field service event.

According to further aspects of the present teaching, the service replaceable motor and plate subassembly comprises a non-tapped aperture.

According to further aspects of the present teaching, a self-tapping screw is capable of penetrating and self-threading the non-tapped aperture of the motor and plate subassembly and passing through the aperture of the rear bracket of the long-bar latch to engage the motor and plate subassembly to the rear bracket of the long-bar latch.

According to further aspects of the present teaching, the self-tapping screw ensures secure fastening of the service replaceable motor and plate subassembly to the latch's rear bracket thus eliminating the risks of inferior thread engagement due to worn thread surfaces.

According to further aspects of the present teaching, the long-bar latch includes two tabs on a first half side of the motor and plate subassembly and a tab on a second half side of the motor and plate subassembly that engages corresponding rectangular apertures in the rear bracket of the long-bar latch to manage linear structural loads upon the connection of the motor and plate subassembly to the rear bracket. According to a further aspect of the present teaching, the tab on the second half side of the motor and plate subassembly is positioned at a side edge of the motor and plate subassembly.

According to further aspects of the present teaching, the motor and plate subassembly includes a single point electrical connector adjacent a motor that ensures accurate wiring connection of the motor of the motor and plate subassembly to a wiring harness.

According to further aspects of the present teaching, the appliance is a cooking oven and the screwdriver is a flat blade screwdriver.

Provided is a kit for servicing a long-bar latch for an appliance. According to certain aspects of the present teaching, the appliance may be an oven. The kit includes a service replaceable motor and plate subassembly capable of being engaged to a rear bracket of the long-bar latch, and a self-tapping screw, wherein the service replaceable motor and plate subassembly includes a non-tapped aperture and wherein the self-tapping screw is capable of penetrating and self-tapping the non-tapped aperture of the motor and plate subassembly and passing through an aperture in the rear bracket of the long-bar latch to engage the motor and plate subassembly to the rear bracket of the long-bar latch.

According to further aspects of the present teaching, the motor and plate subassembly includes at least one tab that is capable of engaging a corresponding aperture in the rear bracket of the long-bar latch.

According to further aspects of the present teaching, the kit includes two tabs on a first half side of the motor and plate subassembly and a tab on a second half side of the motor and plate subassembly that are capable of engaging corresponding rectangular apertures in the rear bracket of the long-bar latch to manage linear structural loads upon the connection of the motor and plate subassembly to the rear bracket.

According to further aspects of the present teaching, the motor and plate subassembly includes a single point electrical connector adjacent a motor that ensures accurate wiring connection of the motor of the motor and plate subassembly to a wiring harness.

According to further aspects of the present teaching, the kit may or may not include a screwdriver.

According to further aspects of the present teaching, the kit may or may not include a flat blade screwdriver.

Provided is a method for replacing a service replaceable motor and plate subassembly of a long-bar latch for an appliance. The method includes the following steps: disconnecting a wire harness from a single point connector on the motor and plate subassembly; removing a self-tapping screw from a self-tapped aperture on the motor and plate subassembly; inserting a screwdriver into an actuation slot in the motor and plate subassembly and rotating the screwdriver to slide the motor and plate assembly in a lateral direction to disengage at least one tab on the motor and plate assembly from a corresponding aperture on a rear bracket of the long-bar latch; moving the motor and plate subassembly in a downward direction and tilting the motor and plate subassembly to disengage a dog-legged bend of a linkage rod in the long-bar latch from a motor cam aperture located on a motor on the motor and plate subassembly; removing the motor and plate subassembly from the rear bracket of the long-bar latch; positioning a new motor and plate subassembly under the rear bracket of the long-bar latch; moving the new motor and plate subassembly in an upward direction and tilting the new motor and plate subassembly to engage the dog-legged bend of a linkage rod in the long-bar latch to a motor cam aperture located on a motor on the new motor and plate subassembly; inserting a screwdriver into an actuation slot in the new motor and plate subassembly and rotating the screwdriver to slide the new motor and plate assembly in a lateral direction to engage at least one tab on the new motor and plate assembly to the corresponding aperture on the rear bracket of the long-bar latch; inserting a self-tapping screw into a non-tapped aperture on the new motor and plate subassembly and self-tapping a new aperture in the new motor and plate subassembly; continuing to insert the self-tapping screw by passing the self-tapping screw through a corresponding aperture on the rear bracket of the long-bar latch to engage the new motor and plate subassembly of the rear bracket of the long-latch; and engaging the wire harness to the single point connector on the motor and plate subassembly.

BRIEF DESCRIPTION OF THE DRAWINGS

The accompanying drawings in the following description illustrate various exemplary embodiments of the present disclosure. It is understood that a person of ordinary skill in the art may derive other embodiments from these drawings which fall within the scope of the disclosure set forth herein.

DETAILED DESCRIPTION

Figure 1:
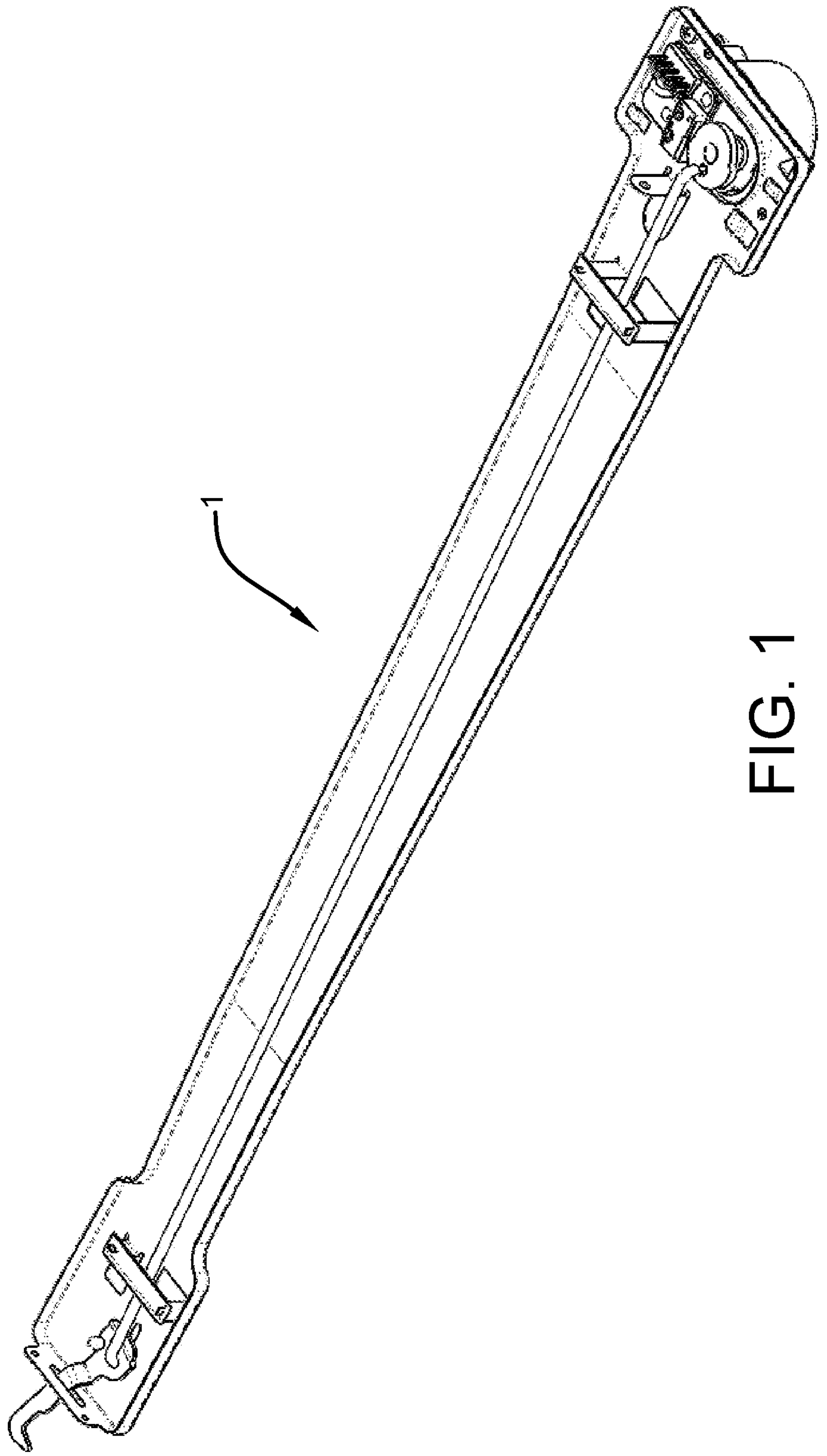
FIG. 1 is an isometric view of an exemplary embodiment of a complete long-bar latch.

The present disclosure relates to a long-bar latch assembly. The long-bar latch assembly may be incorporated into appliances such as ovens and may be used during operation of a self-cleaning function of the appliance.

The long-bar latch assembly disclosed herein is efficiently serviceable with intuitive, accurate, and reliable servicing results. With reference to FIGS. 1-8, the latch assembly (1) incorporates a motor and plate subassembly (7) positioned on a rear bracket (6) of long-bar latch assembly (1). The motor and plate subassembly (7) can be removed by disconnecting a wire harness (e.g., an oven wiring harness) from a single point connector (17) on the motor and plate subassembly (7) and then removing one self-tapping screw (8) from a self-tapped aperture (9) on the motor and plate subassembly. Inserting a screwdriver (e.g., a flat blade or any other suitable screwdriver) into an actuation slot allows the screwdriver to be used as a leveraging tool. With rotation of the screwdriver, the screwdriver will induce a linear forced motion between the motor and plate subassembly (7) and the rear bracket (6) allowing the motor and plate subassembly (7) to slide and release the tabs (13) from engagement with the rear bracket (6) of the long-bar latch assembly (1) enabling the motor and plate subassembly (7) to be slid in a first direction (e.g., to the left or any other suitable direction). The motor and plate subassembly (7) is then free to move in a second direction downward and tilted to disengage a motor cam aperture (16) from a dog-legged bend (15) of linkage rod (5) of the main latch assembly (1). The motor and plate subassembly (7) and the main latch assembly (1) have mating features that provide accurate positioning of the latch components for reliable operation. These features include one or more locating rectangular apertures (12) and one or more locating tabs (13). In certain embodiments, the motor and plate subassembly (7) is a service replaceable component. As such, the new service replaceable motor and plate subassembly (7B) includes a self-tapping mounting aperture that has never been threaded (9B) for receiving a new self-tapping screw (8B) that has never been installed into an aperture. The tapping screw (8B) will be installed into an non-tapped aperture (9B) when replaced by a service technician, thus eliminating the risks associated with installing a previously installed screw into a previously self-tapped aperture or any combination thereof. These risks include, but are not limited to, insufficient engagement of threaded features for the purpose of holding two or more parts together. This insufficiency is created by the galling of engaged surfaces of the self-tapped aperture (9) during the removal of the tapping screw (8) from the previously installed service replaceable motor and plate subassembly (7). The new service replaceable motor and plate subassembly (7B) is installed by tilting it to align the new motor cam aperture (16B) with the dog-legged bend (15) of linkage rod (5) of the main latch assembly (1), then with an upward movement to position one or more tabs (13B) inside one or more rectangular apertures (12) of the rear bracket (6) of the main latch assembly (1). Then by inserting a screwdriver (e.g., a flat blade or Phillips screwdriver) into the actuation slot (14) and rotating the screwdriver clockwise (or counterclockwise if reverse threaded), the service replaceable motor and plate subassembly (7B) will slide to the right allowing the non-tapped aperture (9B) to be accessible for installation of the new self-tapping screw (8B) to be installed and the oven's wire harness connected to the single-point connector (17B).

Figure 9:
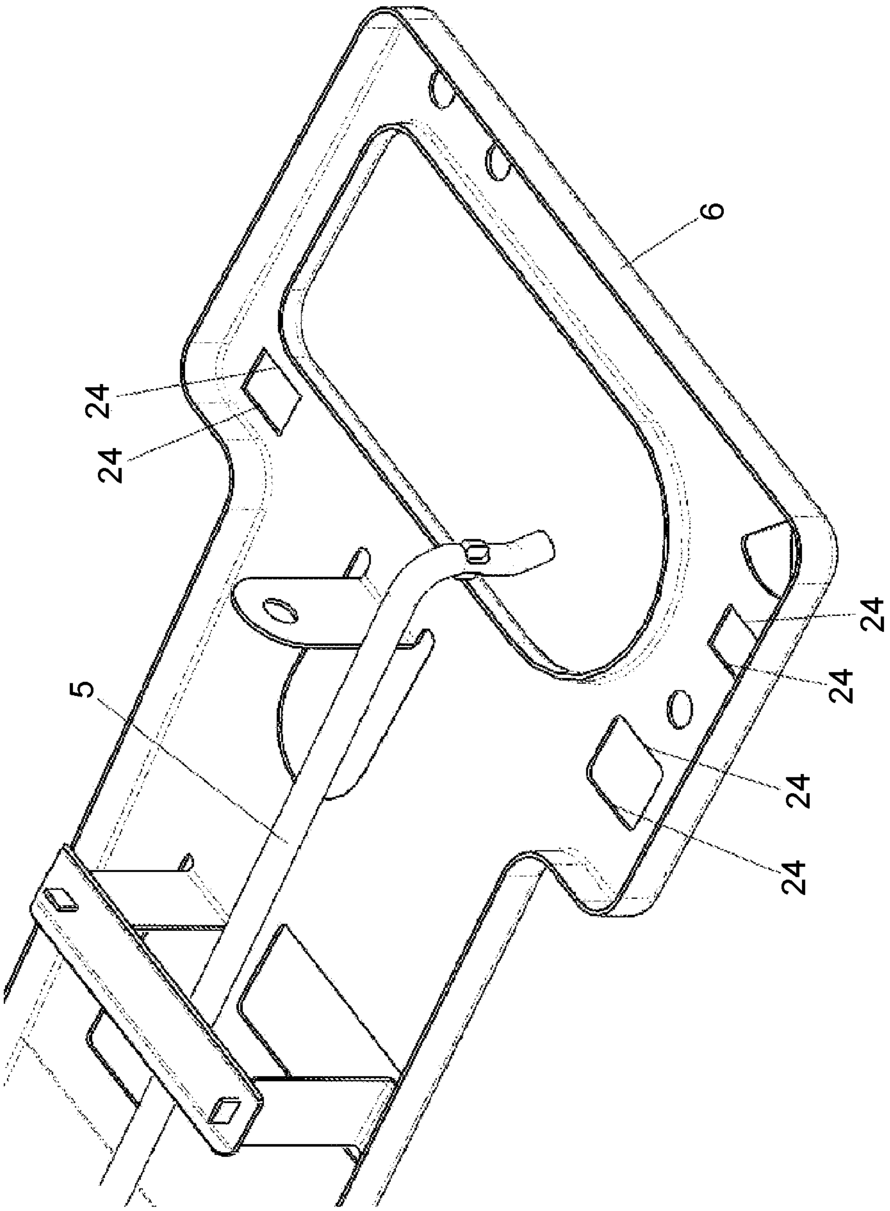
FIG. 9 is a perspective view of a rear bracket of a long-bar latch.
Figure 10:
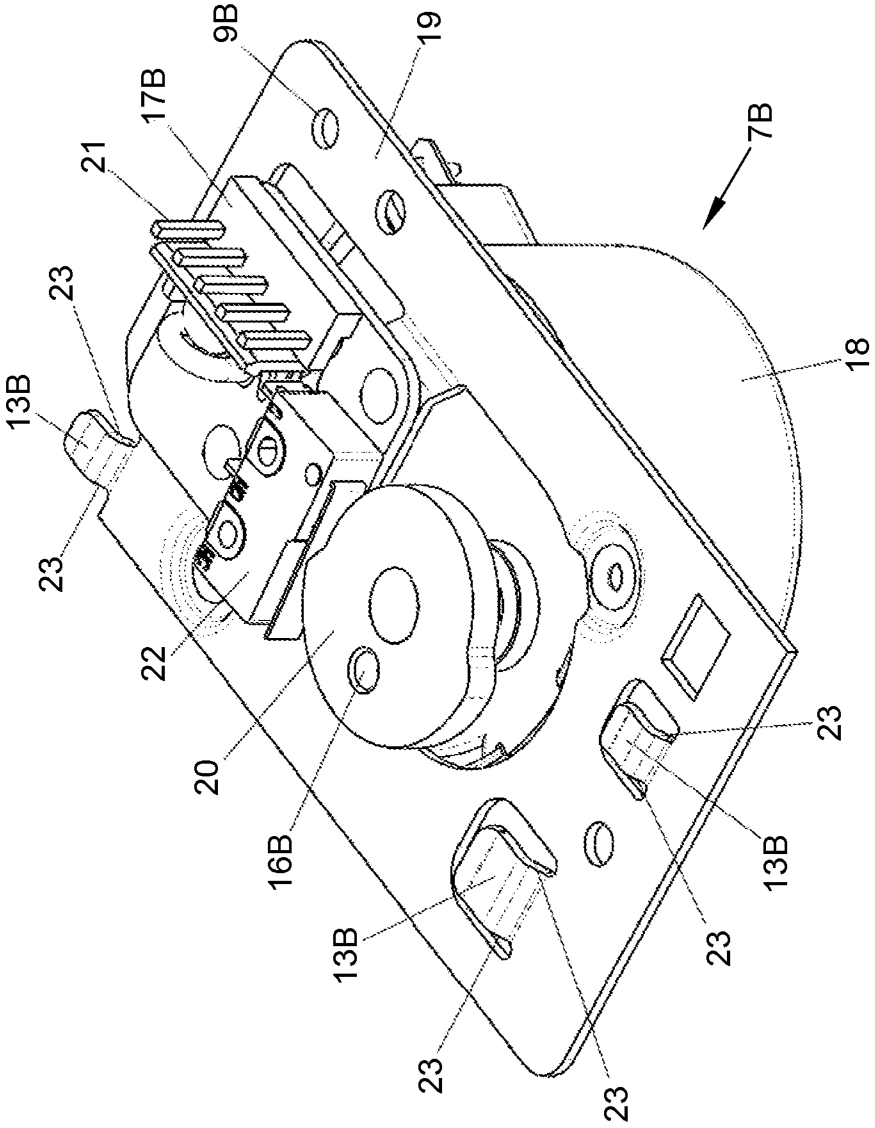
FIG. 10 is a perspective view of a motor and plate assembly.

FIGS. 9-10 provide more comprehensive illustrations of service replaceable motor and plate subassembly (7B). Here it is shown that service replaceable motor and plate subassembly (7B) contain a motor (18), a mounting plate (19), a motor cam (20) with a cam aperture (16B), a single point connector (17B) with multiple connection pins (21), and a position sensing switch (22) that provides information related to the latching status to the oven's controller. Further, the service replaceable motor and plate subassembly (7B) has one or more tabs (13B) with structural engaging edges (23) that engage with one or more mating edges (24) of the rectangular apertures (12) in the rear bracket (6). These engaging edges structurally manage linear forces conveyed by the linkage rod (5), during latching operations, upon the connection between the mounting plate (19) and the rear bracket (6).

The serviceable long-bar latch assembly disclosed herein will significantly minimize service labor and will make the finished result of servicing the latch reliable for function during the self-clean process. Furthermore, the incorporation of locating features that accurately connect the motor and plate subassembly (7) to the main assembly enhances positioning of the component parts and allows for managing higher structural loads associated with higher hook pull-in forces.

Figure 2:
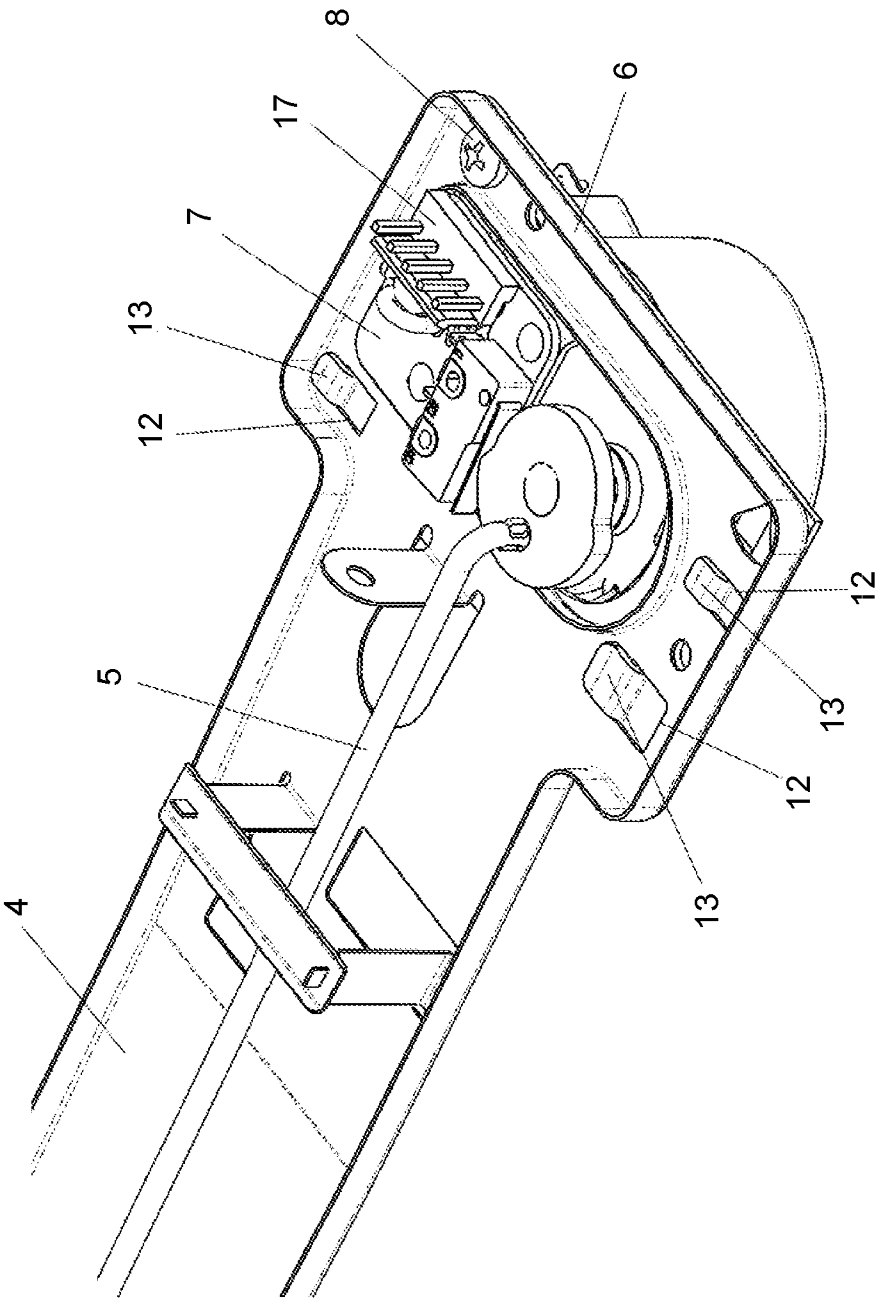
FIG. 2 is a perspective view of a rear portion of an exemplary long-bar latch.
Figure 3:
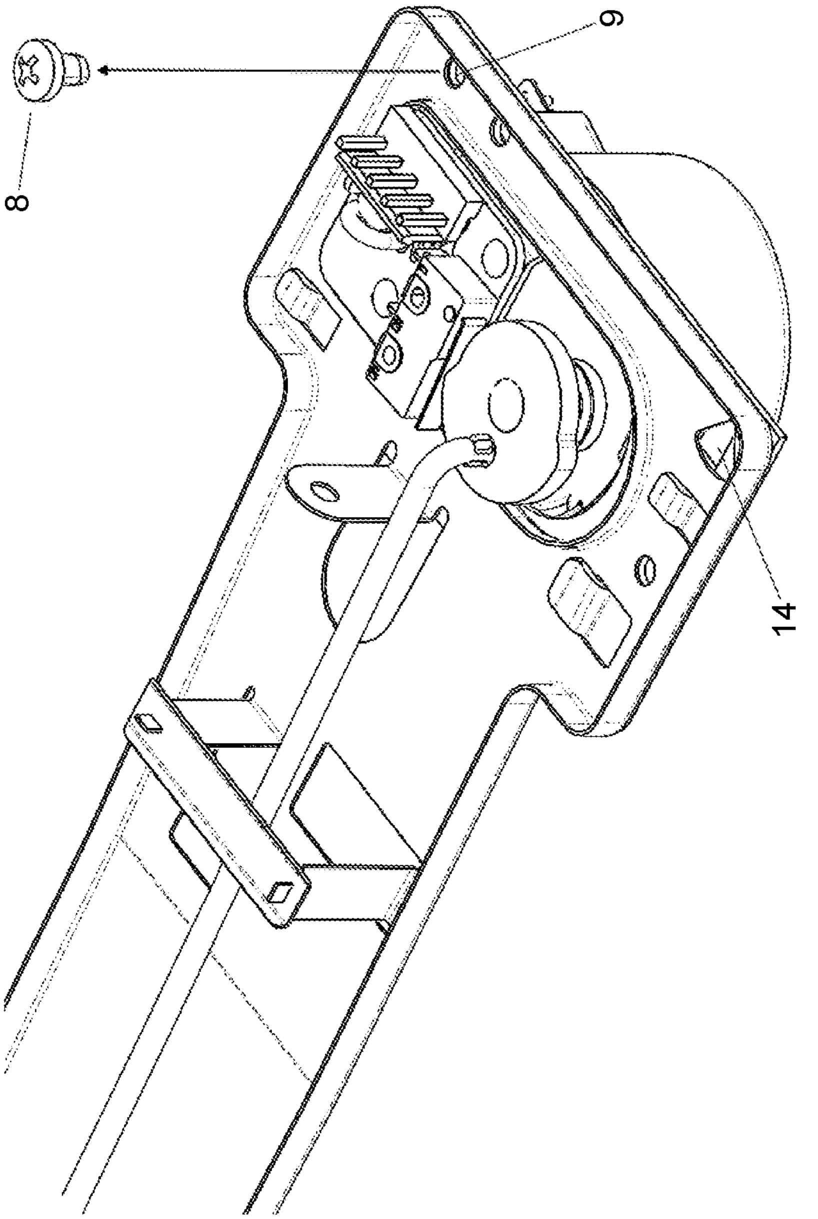
FIGS. 3 to 6 are perspective views of a rear portion of an exemplary long-bar latch showing how a motor and plate assembly may be disengaged and removed from a rear bracket of the long-bar latch.
Figure 4:
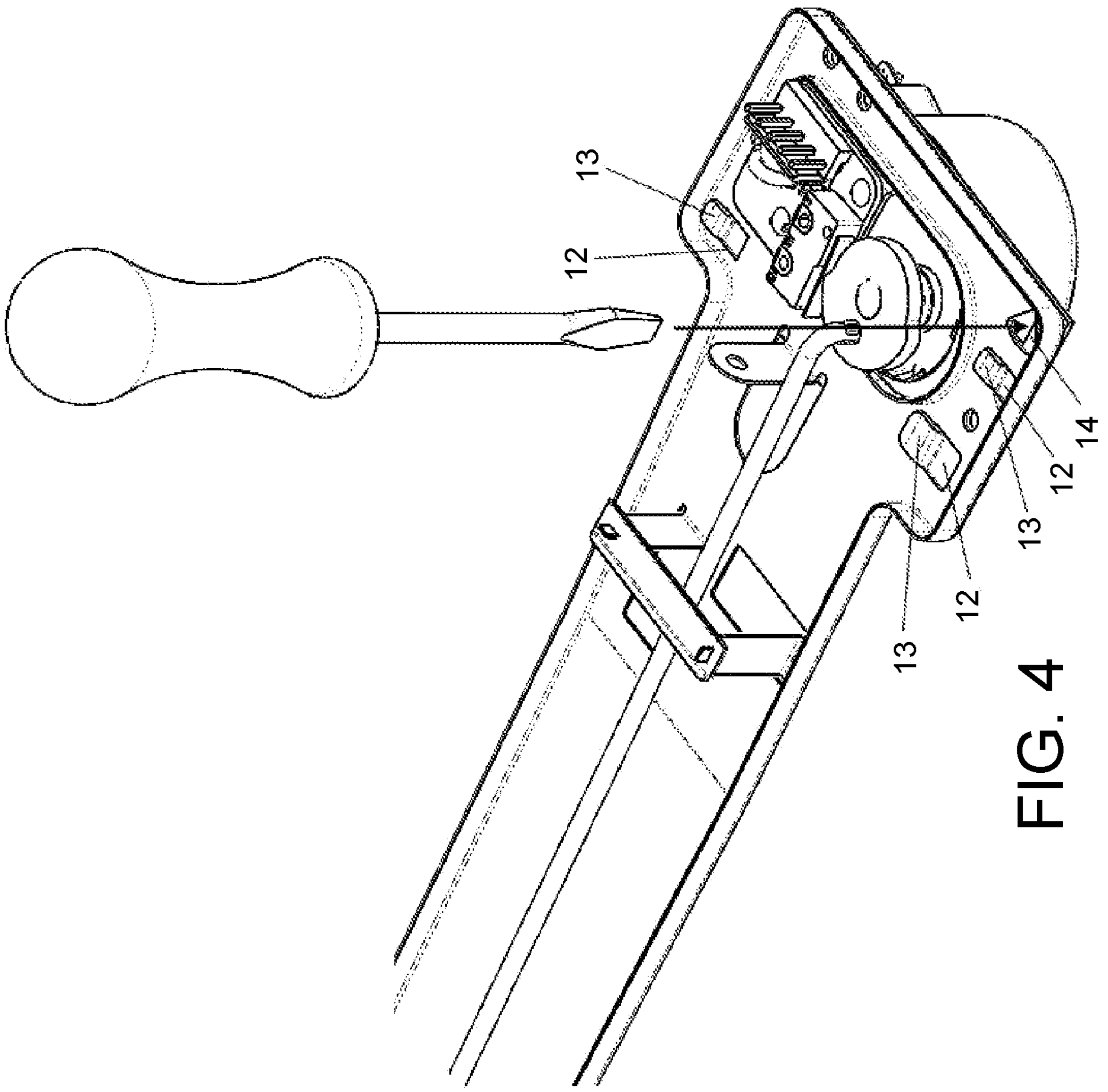
Figure 5:
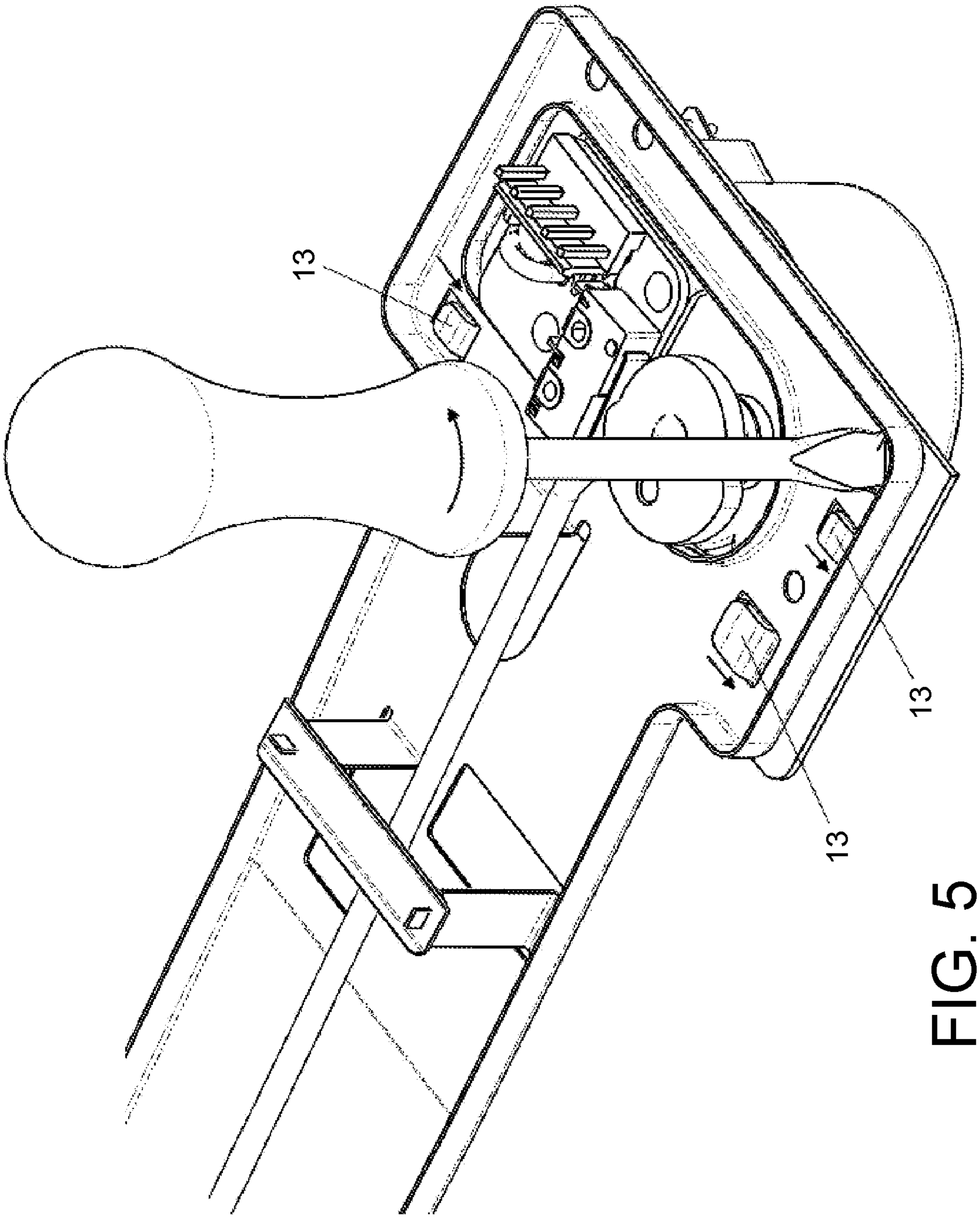
Figure 6:
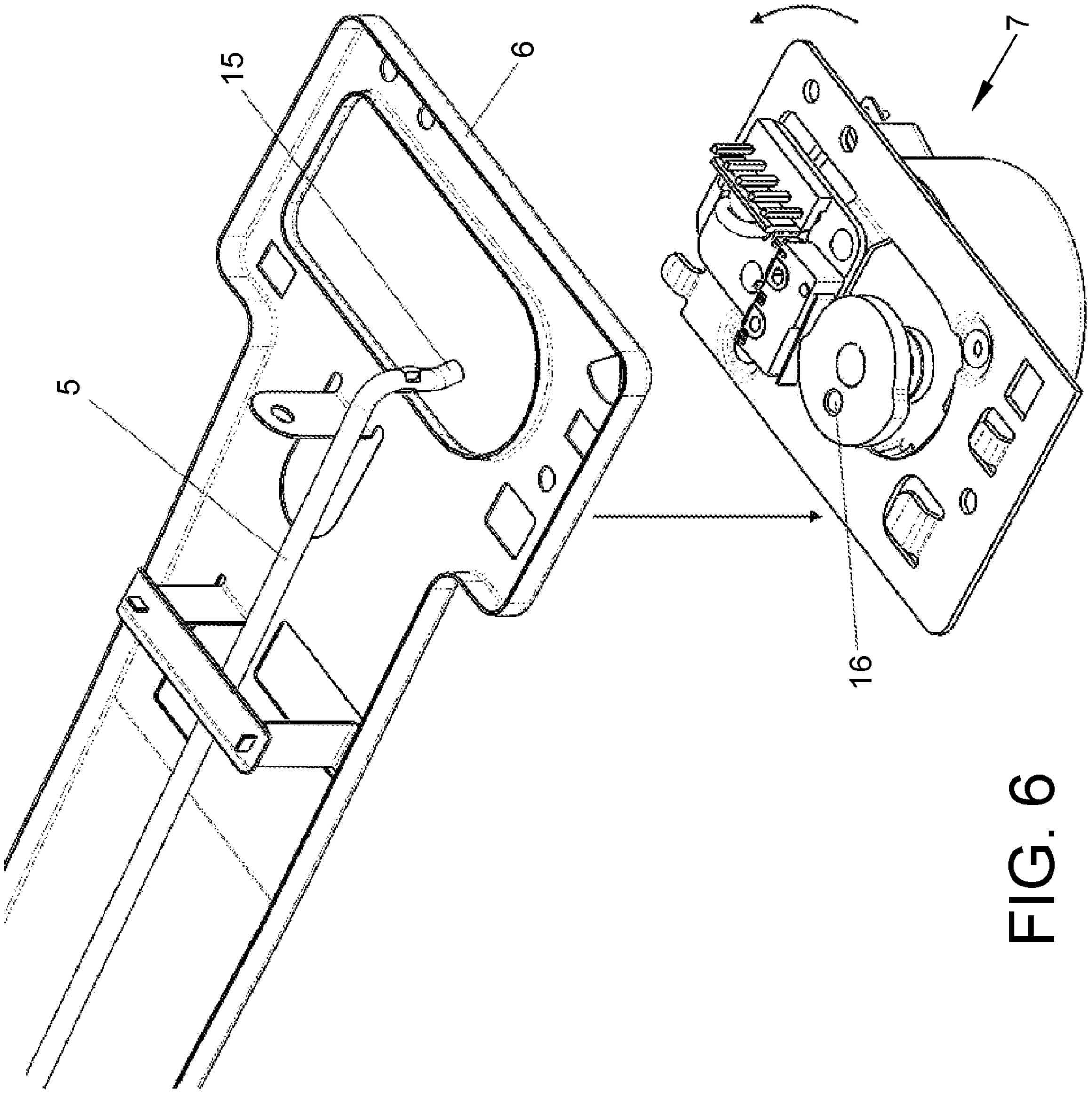
Figure 7:
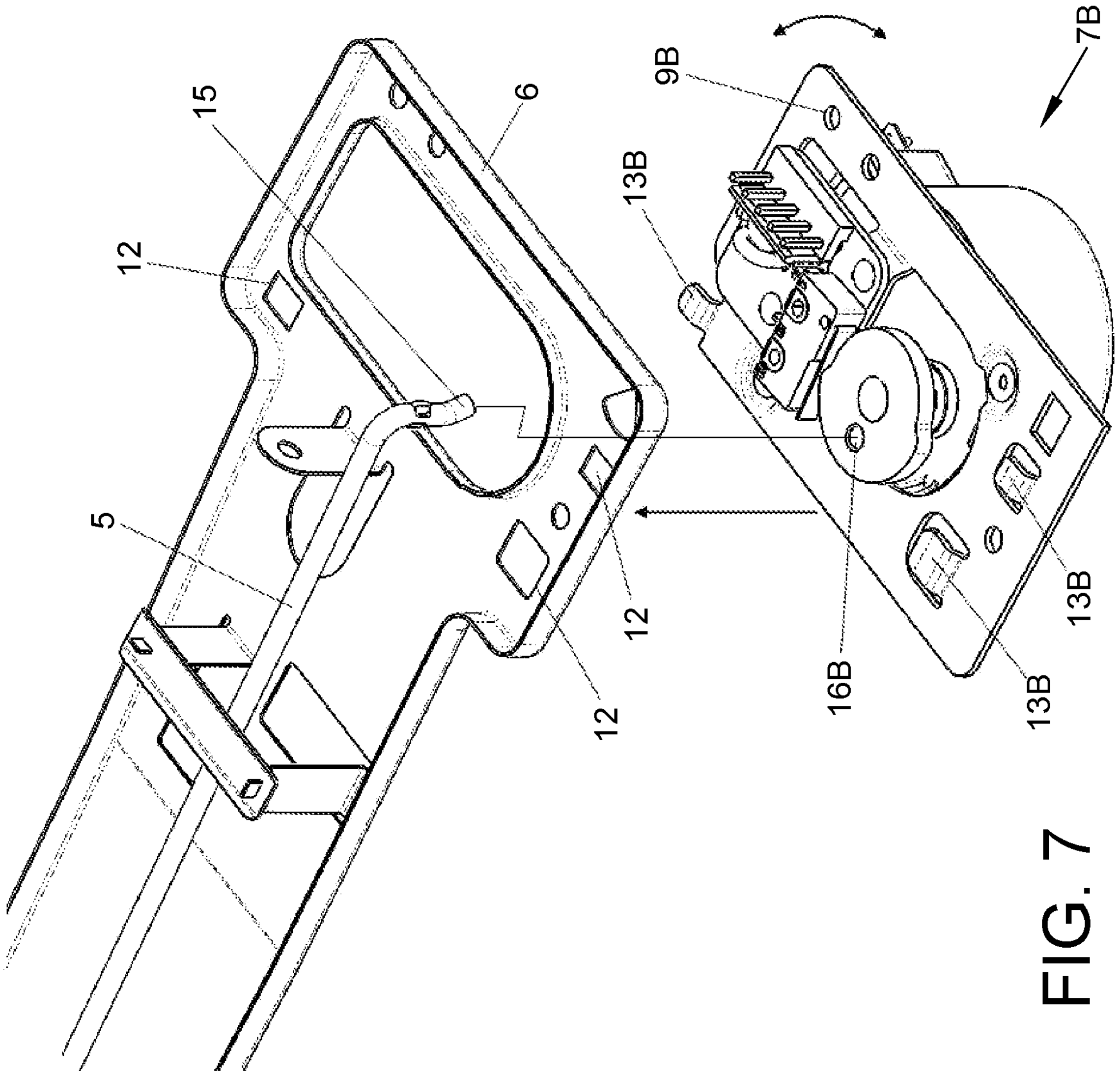
FIGS. 7 to 8 are perspective views of a rear portion of an exemplary long-bar latch showing how a motor and plate assembly may be inserted and aligned to a rear bracket of the long-bar latch.
Figure 8:
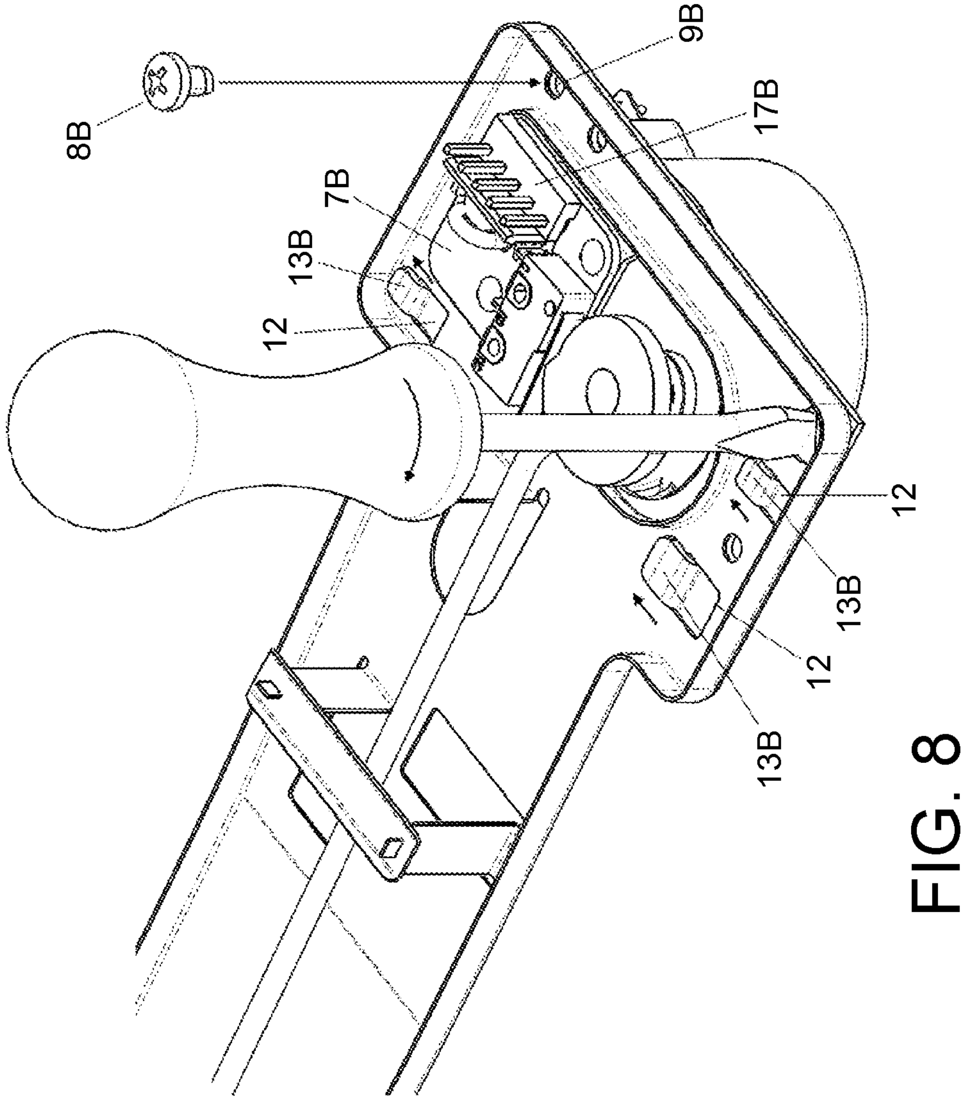

A summary of the component parts of the long-bar latch assembly shown in FIGS. 1-3 is provided below:

| Reference Number | Description |
|---|---|
| 1 | Complete Long-bar Latch Assembly |
| 2 | Front Bracket |
| 3 | Latch Hook |
| 4 | Structural Bar |
| 5 | Linkage Rod |
| 6 | Rear Bracket |
| 7 | Motor & Plate Subassembly |
| 8 | Self-tapping Screw |
| 9 | Self-tapping Aperture |
| 10 | Locating Emboss |
| 11 | Locating Notch |
| 12 | Locating Rectangular Aperture |
| 13 | Locating Tab |
| 14 | Actuation Slot |
| 15 | Dog-legged Bend |
| 16 | Cam Aperture |
| 17 | Single Point Connector |
| 18 | Motor |
| 19 | Mounting Plate |
| 20 | Motor Cam |
| 21 | Connection Pins |
| 22 | Latch Status Sensing Switch |
| 23 | Engaging Edges of Mounting Plate |
| 24 | Mating Edges of Rectangular Aperture |

While the long-bar latch assembly provided herein have been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the electromechanical assembly should not be limited to any single embodiment, but rather construed in breadth and scope in accordance with the recitations of the appended claims.

What is claimed is:

1. A method for replacing a service replaceable motor and plate subassembly of a long-bar latch for an appliance comprising:

disconnecting a wire harness from a single point connector on the motor and plate subassembly;

removing a self-tapping screw from a self-tapped aperture on the motor and plate subassembly;

inserting a screwdriver into an actuation slot in the motor and plate subassembly and rotating the screwdriver to slide the motor and plate subassembly in a lateral direction to disengage at least one tab on the motor and plate subassembly from a corresponding aperture on a rear bracket of the long-bar latch;

moving the motor and plate subassembly in a downward direction and tilting the motor and plate subassembly to disengage a dog-legged bend of a linkage rod in the long-bar latch from a motor cam aperture located on a motor on the motor and plate subassembly;

removing the motor and plate subassembly from the rear bracket of the long-bar latch;

positioning a new motor and plate subassembly under the rear bracket of the long-bar latch;

moving the new motor and plate subassembly in an upward direction and tilting the new motor and plate subassembly to engage the dog-legged bend of a linkage rod in the long-bar latch to a motor cam aperture located on a motor on the new motor and plate subassembly;

inserting the screwdriver into an actuation slot in the new motor and plate subassembly and rotating the screwdriver to slide the new motor and plate subassembly in a lateral direction to engage at least one tab on the new motor and plate subassembly to the corresponding aperture on the rear bracket of the long-bar latch;

inserting a self-tapping screw into a non-tapped aperture on the new motor and plate subassembly and tapping a new aperture in the new motor and plate subassembly;

continuing to insert the self-tapping screw by passing the self-tapping screw through a corresponding aperture on the rear bracket of the long-bar latch to engage the new motor and plate subassembly of the rear bracket of the long-bar latch; and engaging the wire harness to the single point connector on the motor and plate subassembly.

* * * * *